US 6,325,929 B1

(12) United States Patent
Bassett

(10) Patent No.: US 6,325,929 B1
(45) Date of Patent: Dec. 4, 2001

(54) REPLACEMENT FILTER CARTRIDGE FOR WATER FILTERING SYSTEM

(75) Inventor: Laurence W. Bassett, Killingworth, CT (US)

(73) Assignee: Cuno Incorporated, Meriden, CT (US)

(*) Notice: Subject to any disclaimer, the term of this patent is extended or adjusted under 35 U.S.C. 154(b) by 0 days.

(21) Appl. No.: 09/678,939

(22) Filed: Oct. 4, 2000

Related U.S. Application Data

(63) Continuation of application No. 09/169,204, filed on Oct. 8, 1998.

(51) Int. Cl.⁷ .................................................. B01D 39/16
(52) U.S. Cl. .................. 210/238; 210/470; 210/497.01; 210/502.1
(58) Field of Search ................................. 210/450, 454, 210/502.1, 238, 438, 440, 443, 444, 453, 470, 497.01

(56) References Cited

U.S. PATENT DOCUMENTS

| | | |
|---|---|---|
| 4,139,468 | 2/1979 | Rosaen . |
| 4,636,307 | 1/1987 | Inoue et al. . |
| 4,749,484 | 6/1988 | Greenhut . |
| 4,781,830 * | 11/1988 | Olsen .................................. 210/450 |
| 4,804,467 | 2/1989 | Losos . |
| 4,828,698 | 5/1989 | Jewell et al. . |
| 4,836,923 * | 6/1989 | Popoff et al. ...................... 210/454 |
| 5,066,391 * | 11/1991 | Faria .................................. 210/85 |
| 5,139,668 | 8/1992 | Pan et al. . |
| 5,151,180 * | 9/1992 | Giordano et al. ............... 210/321.88 |
| 5,505,892 * | 4/1996 | Domme ............................ 210/502.1 |
| 5,656,160 | 8/1997 | Parise et al. . |
| 5,700,371 | 12/1997 | Koslow . |
| 5,707,518 * | 1/1998 | Coates et al. ...................... 210/238 |

FOREIGN PATENT DOCUMENTS

1135583 * 5/1988 (JP) ................................. 210/321.88

* cited by examiner

Primary Examiner—Matthew O. Savage
(74) Attorney, Agent, or Firm—Cummings & Lockwood

(57) ABSTRACT

A filtration device having a base portion including a sump which has an inlet and an outlet and which accommodates a filter element. The base has a reception port for receiving the filter element. The sump optionally is enclosed by a housing which is engaged to a portion of the base.

14 Claims, 6 Drawing Sheets

REPLACEMENT FILTER CARTRIDGE FOR WATER FILTERING SYSTEM

CROSS-REFERENCE TO RELATED APPLICATIONS

The subject application is a continuation of the U.S. application Ser. No. 09/169,204 filed Oct. 8, 1998, which is now abandoned.

BACKGROUND OF THE INVENTION

1. Field of the Invention

The subject invention relates to fluid filtration apparatus, and more particular, to a counter top water filtration unit for domestic use.

2. Background of the Related Art

Due to run-off and environmental contamination, drinking water in most areas of the world contains appreciable amounts of dissolved chemicals and suspended particulate material. A number of chemicals and particulates that may be found in drinking water have been associated with possible adverse physiological effects. Other chemicals and particulates in drinking water have been associated with less than desirable taste and sensory perceptions, such as "clouding" of the water or "souring" of the water. Chemicals and particulates in a water source may also lead to undesirable rings in appliances and commodes using large amounts of water, and may result in unsightly films being placed on items washed in the water. In the estimation of many persons, municipal water treatment plants often fail to adequately deal with these problems. In order to improve water quality, many residences and businesses now employ on-site water filters to filter water streams consumed therein.

Until relatively recently, most on-site water filters were typically designed to be mounted in a permanent housing coupled to a water stream, such as in series with a pipe. Such permanent housings were often located in relatively poorly accessible locations (such as under a sink or in the basement) and often required special tools in order to gain access to the filter residing in the housing (such as a wrench). While on-site permanent filters are often perceived to remediate the water sufficiently for everyday uses, such as washing dishes and clothes, there is a large and growing number of people who demand cleaner and more tasteful water for internal consumption. Rather than adding new types of filters into permanent-type on-site water filter housings or increasing the number of such housings, in order to provide for a more convenient manner of coupling filters to water streams and of changing filters, so-called "countertop filtration units" were developed. "Countertop filtration units" are portable filter apparatuses dimensioned to fit on a standard household countertop and adapted for coupling to a fluid flow outlet spigot, such as a faucet. Such units are generally primarily intended for domestic use to filter impurities out of tap water. The unit may be placed on a counter adjacent to a sink.

Countertop filtration units are generally fabricated from plastic and/or metal. Conventionally, these units comprise a base upon which a "sump", such as cup or cover, which acts as a sump, is placed and in which the filter cartridge is housed. The "sump" is generally screwed into the base wherein a seal typically exists to permit fluid tight sealing. The filter in conventional counter filtration units is changed by removing the "sump", pulling out the spent filter, inserting a new filter into the "sump" and reattaching the same to the base. The "sump" has an inlet opening to enable an entrance of the fluid into the "sump" and through the filter materials. The "sump" further has an outlet opening to enable the fluid to be discharged from the "sump" after it has coursed through the filter. The unit may further be equipped with a valve to selectively divert the fluid flowing to the filter cartridge.

Filtration is the process of separating particles from a fluid suspension (liquid or gas) by use of a porous medium or by means of a medium possessing chemical properties, such as hydrophobicity, electrostatic charge, etc., which permit such medium to interact and hold the particles which are to be separated from the fluid while permitting the fluid to pass there through. In conventional filtration, the filter medium retains most of the suspended particles which are filtered on or within itself, but allows the fluid being filtered to pass through unimpeded. Flow across the filter medium is generally achieved by the application of a driving force, usually in the form of a static pressure difference across the filter, which may be generated, for example by external pressure applied upstream, a vacuum applied downstream, gravity, or other force.

Filters used in countertop filtration units are designed to be disposable. One commonplace type of disposable filter is in the form of a solid porous cylinder having a hollow center. When such filters are employed, the fluid to be filtered flows radially through the wall of the cylinder between its exterior and hollow core. Such filters are generally capped at each end with a boundary sealing-cap to permit sealing between the filter and the housing in which it is placed in such a manner as to assure that only fluid having passed through the wall of the filter cylinder and into the hollow core is permitted to exit from the filtration unit. Typically, countertop filtration units employ filters fabricated from granular activated carbon. Granular activated carbon is useful for removing organic chemicals such as chlorine, hydrogen sulfide, pesticides, herbicides, phenol, chlorophenol and hydrocarbon from water. Other filter elements may be employed as well to help remove sediments such as rust and other particles. Silver salts are sometimes added to the filter material to combat bacterial growth. Ion exchange resins are also used in such filtration units.

While carbonaceous filter elements are known to be good at removing contaminants that affect taste, odor of the filtrate, and visible particulate matter, such filters generally are not fine enough to remove bacteria or viruses.

There are numerous microporous elements available for removing bacteria and viruses. Among these elements are hollow fibers having micropores coursing through the fiber walls. Typical microporous hollow fibers include Celgard™ manufactured by Questar division of Celanese Corporation. Such hollow fibers offer controlled and relatively uniform porosity as compared to many asymmetric ultrafiltration and microfiltration membranes. Fiber construct is such that there is high membrane surface area-to-volume ratio. The pores in the fibers form tortuous, interconnected channels leading from one surface of the fiber to the other. The pores of these hollow fibers allow the flow of gases and vapors but block passage of many bacteria, colloids and other submicron particles and solutes. Fibers having pores of 0.05 microns or less are capable of filtering most viruses. In order to assure passage of the fluid through the fiber pores rather than through any end, such fibers are generally potted in an epoxy or other standard potting material at both ends of the fiber.

Countertop filter cartridges conventionally can be classified in either of two types: encapsulated and drop-in. Encapsulated cartridges incorporate the "sump", such that the "sump" must be replaced with the filter element. The advantages of encapsulated cartridges are that they are user friendly and the seal between the base and "sump" are replaced each time. There also are advantageous to manufacturers in that they generally require proprietary cartridge replacement. Drop-in cartridges on the other hand are replaced independently of the "sump", the "sump" being re-used each time. The advantage of the drop-in cartridges over encapsulated cartridges is that such cartridges are generally cheaper.

There are problems associated with countertop filtration units employing either encapsulated or drop-in filter cartridges. Both systems require removal of the "sump" from the unit in order to replace the filter. Removal of the "sump" from the base is often less than convenient, given that the "sump" is generally screwed into the base by means of relatively large threads. Further, as most countertop filtration units house the "sump" in an external housing, designed in part to hide the rather non-aesthetic "sump" and inflow/outlet tubes, the external housing must also be removed before access to the "sump" may be had. As the process involved in removing and changing either encapsulated or drop-in filter cartridges is relatively complex, fluid filtration quality often suffers due to less than optimal replacement of the filter. In regard to "drop-in filter cartridges" such filters suffer not only from the problems associated with ease of access to, and replacement of the filter element, but also with respect to the need to continually replace the seal between the "sump" and the base. On the other hand, "encapsulated cartridges," due to the inherent cost of the "sump" which is replaced with each filter change, can be far less than economic.

There is a need, therefore, for an improved countertop filtration unit which permits easy replacement of filter elements and aids in assuring adequate sealing between the "sump" and base.

SUMMARY OF THE INVENTION

The present invention provides an improved countertop filtration unit which provides user-friendly filter cartridge replacement and aids in assuring adequate sealing between the sump and base. The present invention provides a countertop filtration unit having a sump integral with the unit's base, the base having a reception port for filter element engagement into, and disengagement out of, the sump.

By "sump" it is meant any reservoir serving as a receptacle for liquids which is constructed so as to able to withstand the fluid pressures to which it is exposed. By "base" it is meant any housing on which the sump rests and which is designed to typically interface with the surface upon which the filter unit is to be placed. By "reception port" it is meant any communication area positioned in the base permitting reception of a filter cartridge into the area and out of the area. By "end-cap" it is meant a substantially solid piece of material placed at the end of a filter element which is dimensioned so as to at least seal the greater portion of the surface area of an end of the filter element. By "adapter" it is meant any structure for joining one element to another. By "fluid adapter," it is meant a structure for allowing communication of a fluid stream with the filter element, typically by means of fluid conduits, such as tubing. By "filter element" it is meant any combination of materials used to filter out suspended or dissolved particles or chemicals from a fluid. By "microporous hollow fibers" it is meant an elongate structure having a central void constructed such to have a relatively high membrane surface area-to-volume ratio and porous walls wherein the pores of the wall lead from one surface of the fiber to the other surface of the fiber and are substantially of such size as to be able to block the passage of submicron particles and organisms. By "external housing" it is meant any housing for surrounding and enclosing the sump. By "inlet" it is meant an opening for intake of fluid, whereas by "outlet" it is meant an opening for the out-take of fluid.

One embodiment of the present invention includes a filtration unit which comprises a base portion including a sump for accommodating a filter element and a reception port for receiving the filter element. The sump has an inlet and an outlet. Preferably the reception port is defined in a bottom surface of the base portion. The unit may further include an external housing portion for engaging the base porition to enclose the sump. Preferably the end cap includes a camming surface for cooperating with a complementary surface in the base portion to facilitate engagement of the end cap and the reception port.

Preferably, the filtration unit has the sump integral with the base portion, and the reception port is defined in a bottom surface of said base portion. Preferably, the filter element to be received in the reception port is dimensioned and configured for accommodation within said sump, and is constructed so as to have an end cap dimensioned and configured for engaging the reception port. The end cap may include a camming surface for cooperating with a complementary surface in said base portion to facilitate engagement of the end cap and the reception port. Preferably, a first seal is associated with either or both the reception port and the end cap so as to effect a seal between the end cap and the base portion. A second seal may further be associated with either one end of the filter element and/or the interior surface of the sump to effect a seal between said filter element and the sump. The filter element may be defined at least in part by an extruded carbon block or by hollow microporous fibers. Preferably, the filter element is a composite filter element including first and second filtration media, wherein the first filtration media comprises an extruded carbon block and the second filtration media comprises hollow microporous fibers.

Still another embodiment of the present invention includes a filtration device which comprises a filter element having an end cap provided at a first end thereof, a base portion including an integral sump for accommodating the filter element and a reception port for receiving the filter element and engaging the end cap; and a housing portion for engaging the base portion to enclose said sump.

In a preferred embodiment the sump is formed monolithically with the base portion. It is preferred that the reception port be defined in a bottom surface of the base portion. While the end cap may be engaged to the base by any of the many attachment mechanisms known in the art, in one embodiment, the end cap includes camming lugs for cooperating with a complementary camming surface in the base portion to facilitate engagement of the end cap and the reception port. It is preferred that a first seal be associated with at least either the reception port and/or the end cap to effect a seal between the end cap and the base portion. A second seal may be associated with at least one of an end portion of said filter element and an interior surface of the sump to effect a seal between the filter element and the sump. The filter element may be defined at least in part by an extruded carbon block or by hollow microporous fibers. Preferably, the filter element is a composite filter element including first and second filtration media, wherein the first filtration media comprises an extruded carbon block and the second filtration media comprises hollow microporous fiber.

And yet another embodiment of the present invention includes a filter device for housing a filter element having an end cap associated with an end thereof, which comprises a base portion for accommodating the filter element, the base portion being integral with a sump having an inlet and an outlet, wherein the base portion encompasses a void through which the filter element may be positioned in said sump, and the base portion surrounding said void includes an engagement surface complementary to the surface of the end cap for engaging the filter element; and a housing portion for engaging the base portion to enclose the sump.

These and other unique features of the system disclosed herein will become more readily apparent from the following description, the accompanying drawings and the appended claims.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF THE INVENTION

Figure 1:
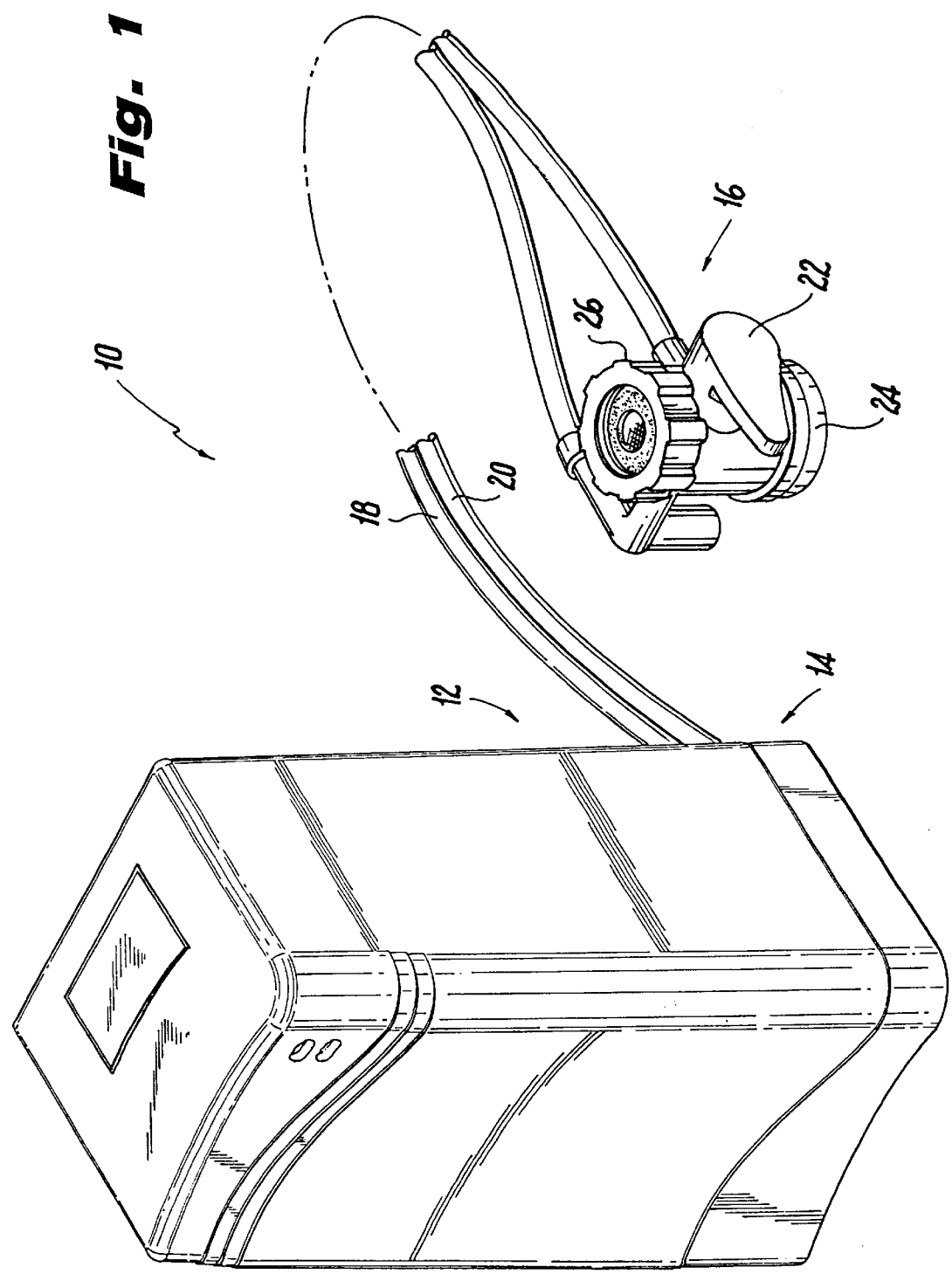
FIG. 1 is a perspective view of a countertop filter unit coupled to an adapter assembly for attaching the filter unit to a fluid stream.

The present invention overcomes many of the prior art problems associated with countertop filtration units The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring to FIG. 1, there is shown a perspective view of a countertop filter unit 10 coupled through one or more conduits 18, 20 to an adapter assembly 16 for attaching the filter unit to a fluid stream. Countertop filter unit 10 includes a base 14 on which is mounted an external housing 12, base 14 and external housing 12 defining the exterior of countertop filter unit 10. Adapter assembly 16 is designed to be connected to fluid flow, as from, for example, a sink, by means of connector 26. Fluid flow entering the adapter through connector 26 may be directed to countertop filter unit 10 by way of conduits 18, or through direct throughput opening 24 in adapter 16, by stopcock 22.

Figure 2:
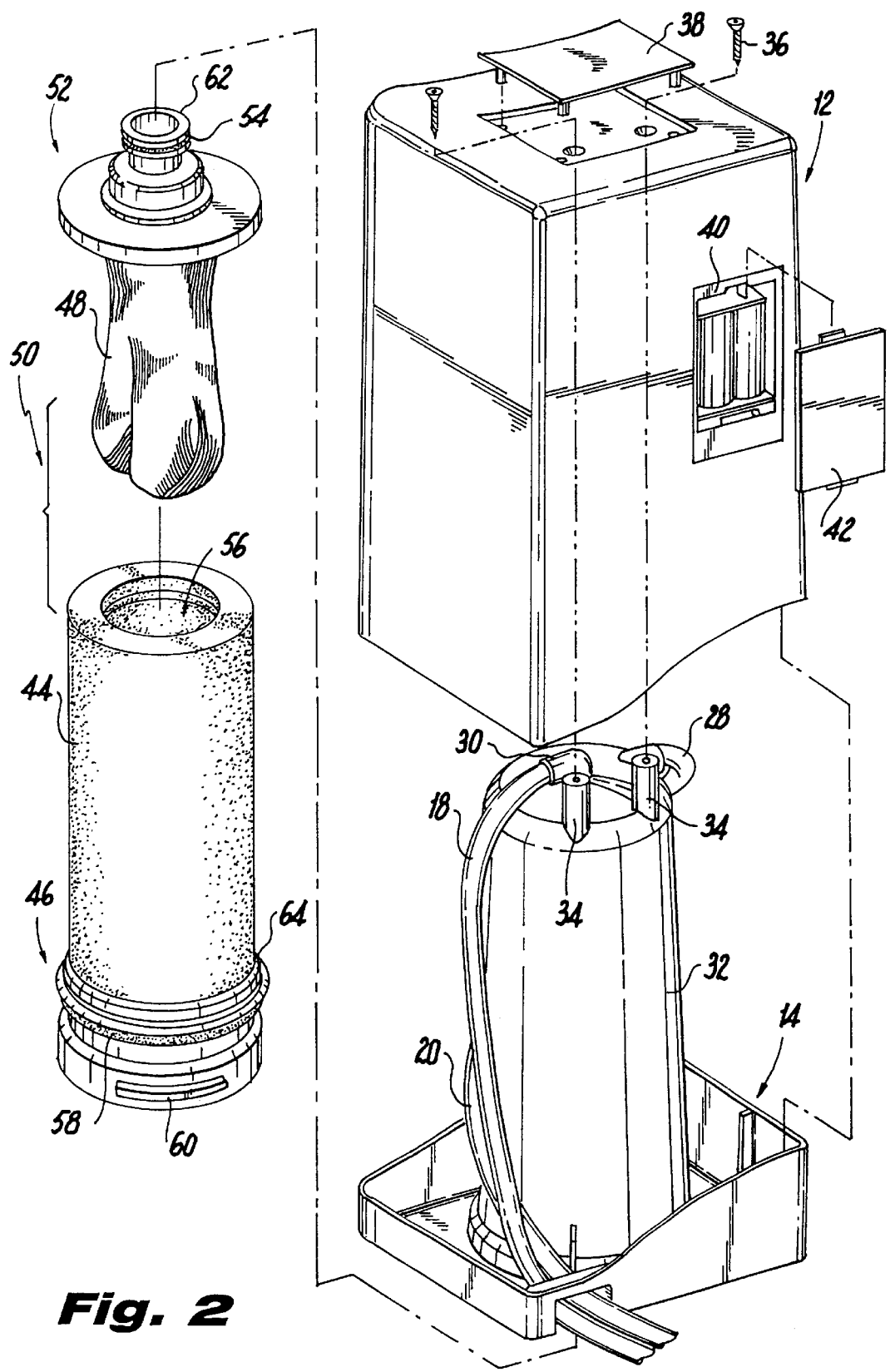
FIG. 2 is a perspective view of a filter unit assembly embodiment of the present invention.

Now referring to FIG. 2, there is shown a perspective view of a filter unit assembly embodiment of the present invention. Base 14 includes sump 32 which is dimensioned to fit a filter cartridge, generally designated in its component parts as 50. Sump 32 is shown to have inlet and outlet, 28 and 30, for admitting to, and removing from, sump 32 fluid. Inlet 28 and outlet 30 are connected to the exterior of filter unit 10 through conduits 20 and 18, respectively. Sump 32 is generally surrounded by cover 12 and may be connected to the same through connecting structure, such as, but not limited to, screws 36 and threaded receptacles 34. A first panel 38 may be positioned over screws 36 to provide for a more aesthetic cover 12 exterior. Cover 12 may further house therein a power source 40 for powering any electronics associated with the filter, such as a timing clock (not shown) to indicate whether filter change is recommended. A second panel 42 may be positioned over power source 40 to provide for a more aesthetic cover 12 exterior. Base 14 may be equipped with stand-offs 74 (See FIG. 5).

Figure 6:
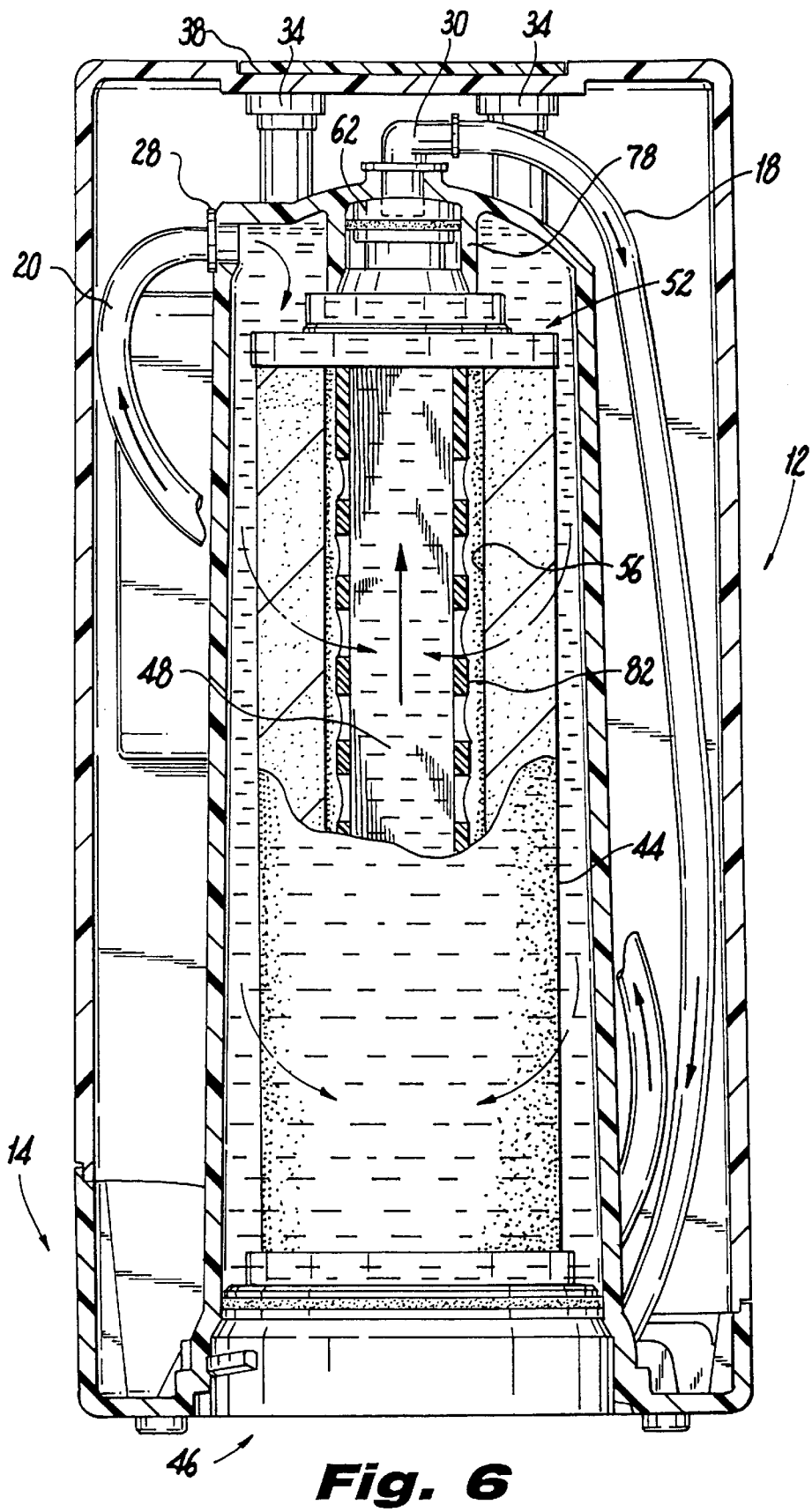
FIG. 6 is a cross-sectional view of the assembled filter unit embodiment of FIG. 2.

Filter cartridge 50, or any other filter cartridge adapted to sealingly fit within sump 32, may be utilized in countertop filter unit 10. Filter cartridge 50 is comprised of two filter elements, one comprising a jacket of carbonaceous material, 44, the other comprising a U-shaped bundle of hollow, microporous fibers 48 as a preferred embodiment. The jacket of carbonaceous material 44 may be formed by an extrusion process. Hollow, microporous, fiber bundle 44 is housed concentrically within the cavity 56 formed by carbonaceous jacket 44. Hollow, microporous, fiber bundle 48 is formed by potting hollow, microporous fibers in the bottom portion of upper cage 82 (See FIG. 8). Upper end-cap 52 has a sealing neck 62 for sealingly connecting to internal sump collar 78 as shown in FIG. 6. Sealing neck 62 preferably is fitted with upper seal 54 to aid in complete sealing between sealing neck 62 and internal sump collar 78. Filter cartridge 50 is further fitted with a lower end-cap 46.

Figures 7, 8:
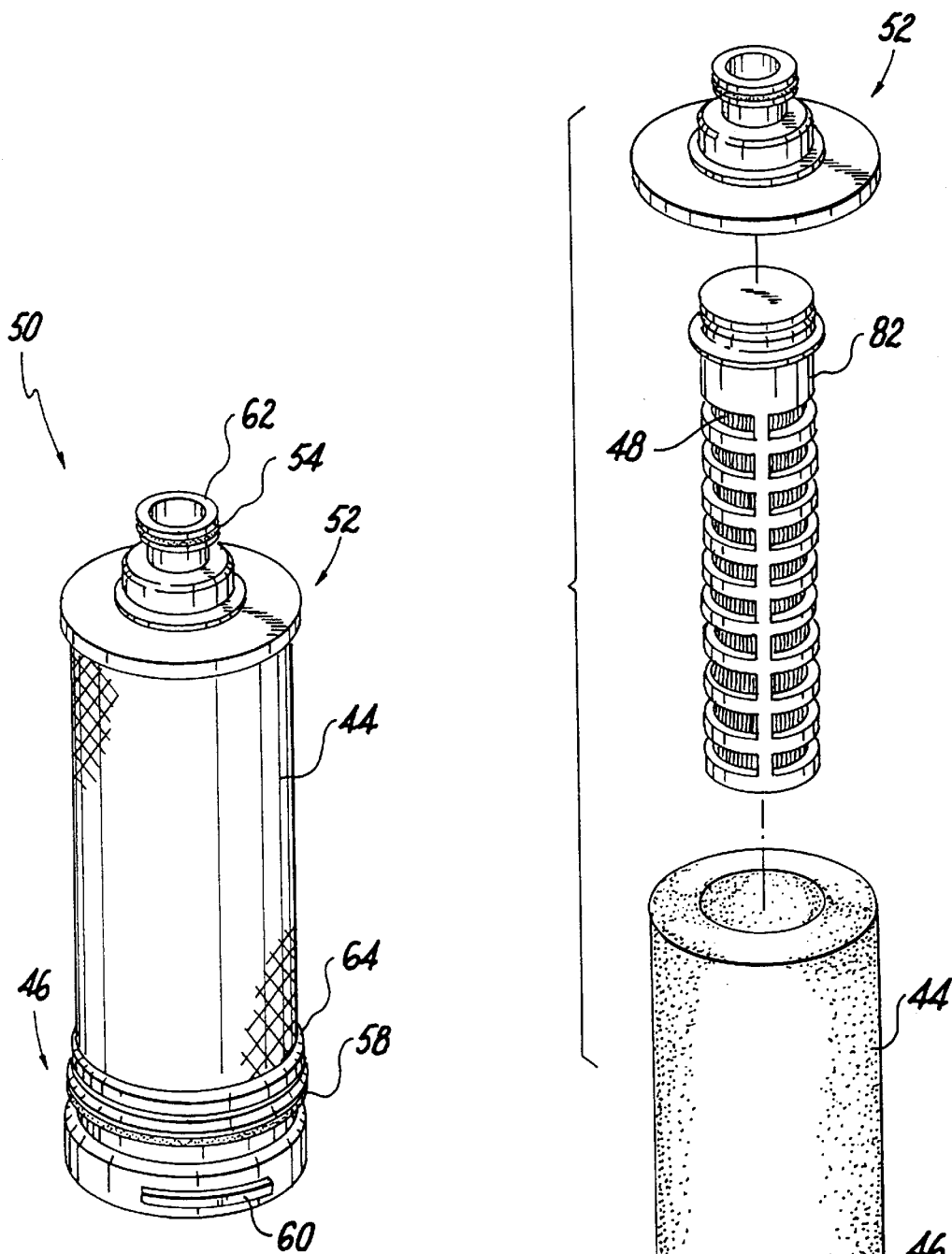
FIG. 7 is a perspective view of the assembled filter cartridge of FIG. 2.
FIG. 8 is an exploded view of the filter cartridge shown in FIG. 2.

As shown in perspective view in FIG. 8, the U-shaped bundle of hollow, microporous fibers 48 may be contained in a cage 82, cage 82 and hollow, microporous fibers being pulled in upper end-cap 52. Cage 82 is positioned within cavity 56 formed by carbonaceous jacket 44.

Figure 3:
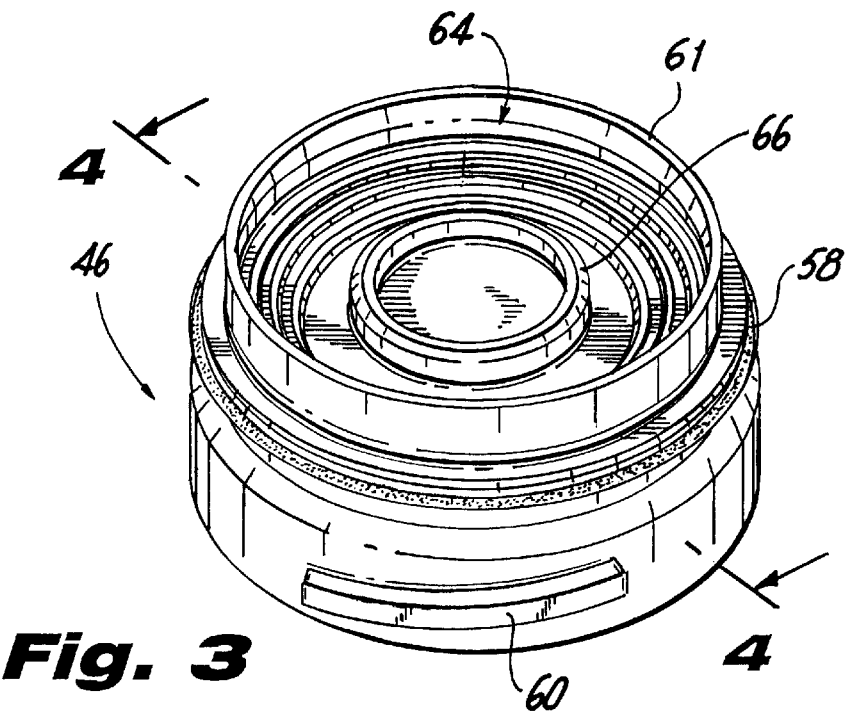
FIG. 3 is a perspective view of an end-cap for engagement into the base portion of the filter unit assembly of FIG. 2.
Figure 4:
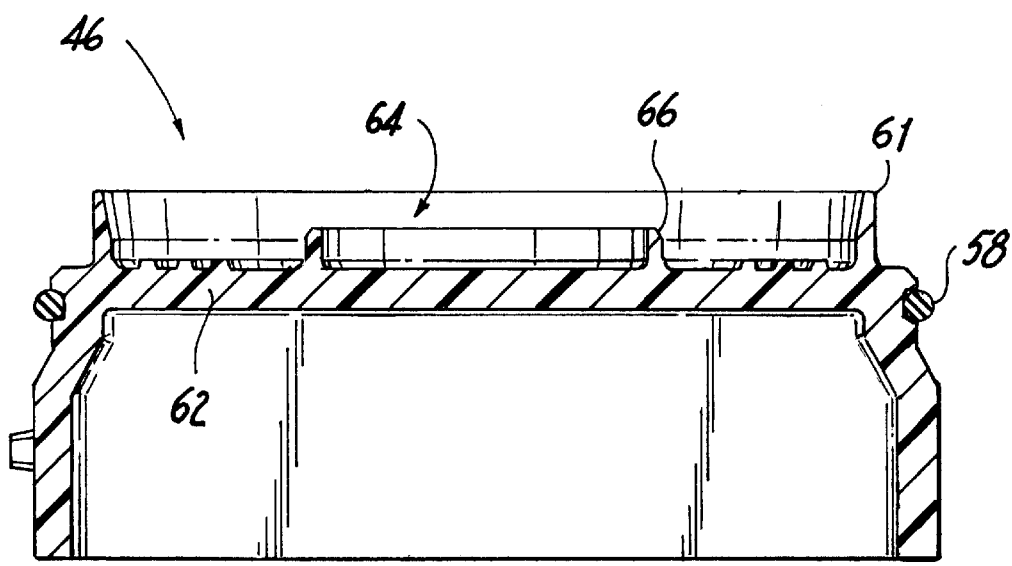
FIG. 4 is a cross-sectional view of the end-cap of FIG. 3 cut along axis 4—4.

As shown in perspective view in FIG. 3, and in cross-sectional view in FIG. 4 (along 4—4 line of FIG. 3), lower end-cap 46 has an imperforate annular wall 61 extending from an imperforate base wall 62 that defines recessed portion 64 for receiving one end of carbonaceous jacket 44. Lower end-cap 46 further has positioned therein centering collar 66 dimensioned so as to fit into cavity 56 of carbonaceous jacket 44. Centering collar 66 aids in centering carbonaceous jacket 44 in lower end-cap 46. Lower end-cap 46 further houses lower seal 58 axially disposed between the annular wall 61 and the engagement structure ledge 60 for aiding in complete sealing between lower end cap 46 and upper surface 76 (See FIG. 5) of base 14. Lower end cap 46 is further constructed with engagement ledge 60 for engaging threaded shoulders 72 (See FIG. 5) of base 14.

Figure 5:
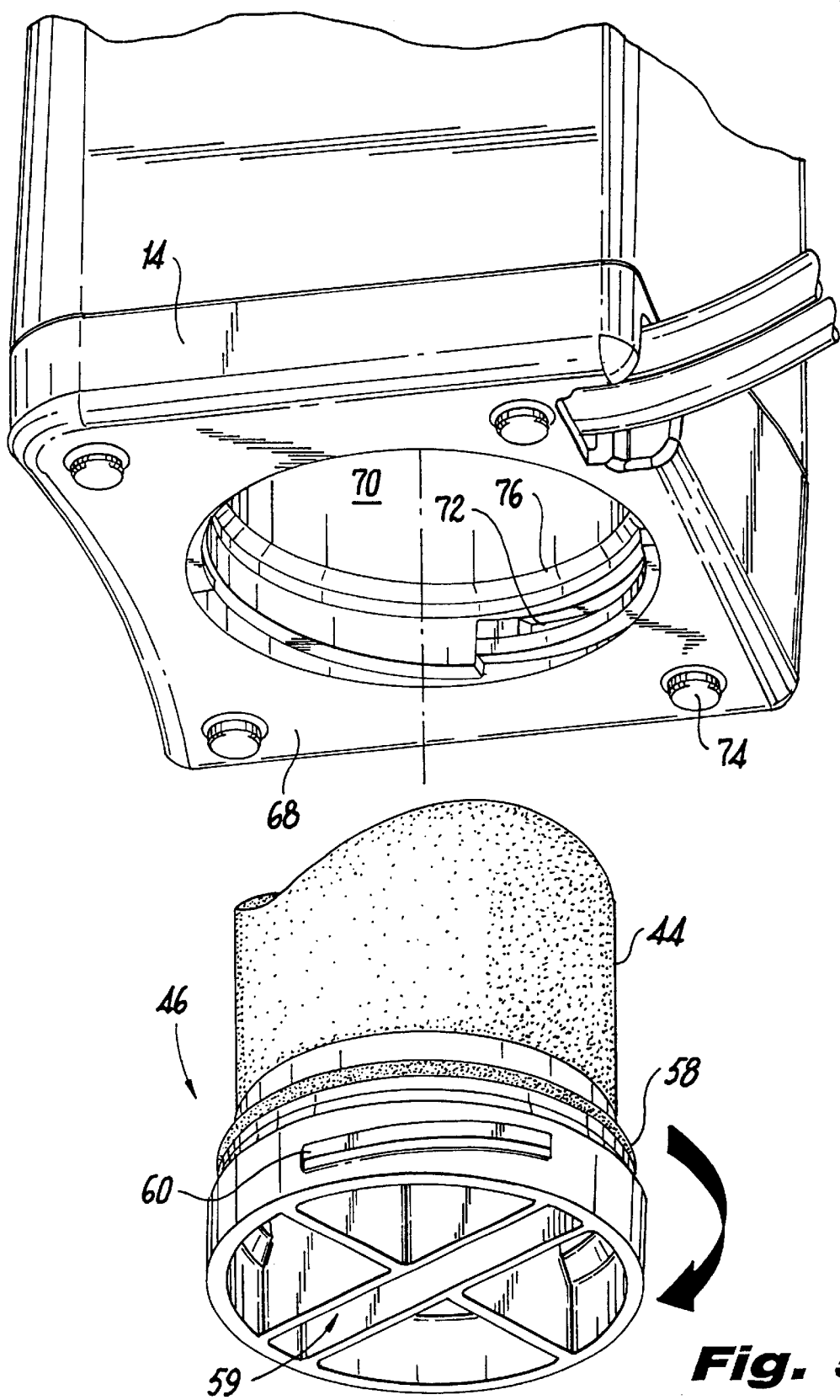
FIG. 5 is an interior perspective view, partly in section, of a filter element endcap/base coupling mechanism of an embodiment of the present invention.

The manner of engaging assembled filter cartridge 50, illustrated in FIG. 7, into base 14 of countertop filter unit 10 is shown in FIG. 5. Upper end-cap 52 of assembled filter cartridge 50 is inserted through base opening 70 from inferior base surface 68. Lower end-cap 46 is subsequently coupled to base 14 by engaging engagement ledge 60 along engaging threaded shoulders 72 so as to affect axial translation of the filter cartridge 50 relative to base 14. Preferably, once lower end-cap 46 is rotated into its locked position, lower end-cap 46 will be flush with base 14. Coupling may be through means of interlocking camming surfaces. Preferably, engagement is such that lower seal 58 is sealing engaged with respect to superior base surface 76. Preferably simultaneous with coupling of lower end-cap 46 with base 14, upper end-cap 52 is also being sealing coupled to the internal surface of internal sump collar 78. Lower end-cap 46 may also be fabricated to have slot 59 in its inferior surface to permit insertion of instruments into slot 59 to ease turning of filter cartridge 50 and thus to engage coupling.

Now referring to FIG. 6, there is shown a cross-sectional view of the assembled filter unit embodiment of FIG. 2. As illustrated, fluid enters through conduit 20 through inlet 28. Fluid circulates about carbonaceous filter element 44 and under pressure crosses the walls of carbonaceous element 44 entering into carbonaceous element cavity 56. Fluid in carbonaceous element cavity 56 is forced by pressure to exit through hollow, microporous fiber bundle 48 and then through upper end cap neck 62 to outlet 30, upper end cap neck 62 being sealingly connected to sump outlet sealing part 78 of sump 32. Outlet 30 is attached to conduit 18 from which filtered water may be obtained. Microporous fiber bundle 48 may be unhoused in cavity 56, or as illustrated, enclosed within a housing, for example, cage 82, which preferably is perforated, and more preferably disposed so as to permit exposure of more than 40% of the total surface area of the fiber bundle to the surrounding fluid.

While the invention has been described with respect to preferred embodiments, those skilled in the art will readily appreciate that various changes and/or modifications can be made to the invention without departing from the spirit or scope of the invention as defined by the appended claims.

What is claimed is:

1. A replacement filter cartridge for a water filtering system including a sump having an interior surface and a reception port for receiving the filter cartridge, the filter cartridge comprising:
    a) an elongated carbon block filter element defining a longitudinal axis, the carbon block filter element having opposed first and second end surfaces and an axial cavity extending along the longitudinal axis of the carbon block filter element and through the first and second end surfaces thereof;
    b) a first end cap positioned at the first end surface of the carbon block filter element, the first end cap having a neck portion and an axial passage extending therethrough, the first end cap configured to cover the first end surface and to provide communication between the axial passage of the first end cap and the axial cavity of the carbon block filter element; and
    c) a second end cap positioned at the second end surface of the carbon block filter element, the second end cap having an imperforate base wall and engagement structure formed thereon for engaging complementary structure formed on the interior surface of the sump, the second end cap having a recessed area defined by an imperforate annular wall extending from the imperforate base wall and configured to cover the second end surface and the axial cavity of the carbon block filter element at the second end surface, wherein the annular wall of the second end cap is axially spaced from the engagement structure of the second end cap in a direction toward the first end cap, a sealing member is axially disposed between the annular wall and the engagement structure, and the second end cap forms a sealed closure for the reception port of the sump.

2. A replacement filter cartridge for a water filtering system as recited in claim 1, wherein the engagement structure includes diametrically opposed engagement structures.

3. A replacement filter cartridge for a water filtering system as recited in claim 1, wherein a first sealing member is positioned about the neck portion.

4. A replacement filter cartridge for a water filtering system as recited in claim 1, wherein the recessed area is defined by an annular wall.

5. A replacement filter cartridge for a water filtering system as recited in claim 4, further comprising a centering collar formed within the recessed area.

6. A replacement filter cartridge for a water filtering system as recited in claim 1, wherein the second end cap includes structure to facilitate axial rotation of the replacement filter cartridge.

7. A replacement filter cartridge for a water filtering system including a sump having an interior surface and a reception port for receiving the filter cartridge, the filter cartridge comprising:
    a) an elongated carbon block filter element defining a longitudinal axis, the carbon block filter element having opposed top and bottom ends and an axial cavity extending along the longitudinal axis of the carbon block filter element;
    b) a first end cap positioned at the top end of the carbon block filter element, the first end cap having a neck portion and an axial passage extending therethrough, the first end cap configured to cover the top end and to provide communication between the axial passage of the first end cap and the axial cavity of the carbon block filter element; and
    c) a second end cap positioned at the bottom end of the carbon block filter element, the second end cap having an imperforate base wall and an outer peripheral surface having engagement structure formed thereon for engaging the interior surface of the sump, the second end cap having a recessed area defined by an imperforate annular wall extending from the imperforate base wall and configured to cover the bottom end and the axial cavity of the carbon block filter element, wherein the annular wall of the second end cap is axially spaced from the engagement structure of the second end cap in a direction toward said first end cap, a sealing member is axially disposed between the annular wall and the engagement structure, and the second end cap forms a sealed closure for the reception port of the sump.

8. A replacement filter cartridge for a water filtering system as recited in claim 7, wherein the engagement structure includes diametrically opposed engagement structures.

9. A replacement filter cartridge for a water filtering system as recited in claim 7, wherein a first sealing member is positioned about the neck portion.

10. A replacement filter cartridge for a water filtering system as recited in claim 7, further comprising a centering collar formed within the recessed area.

11. A replacement filter cartridge for a water filtering system including a sump having an interior surface and a reception port for receiving the filter cartridge, the filter cartridge comprising:
    a) an elongated carbon block filter element defining a longitudinal axis, the carbon block filter element having opposed first and second end surfaces and an axial cavity extending along the longitudinal axis of the carbon block filter element and through the first and second end surfaces thereof,
    b) a first end cap positioned at the first end surface of the carbon block filter element, the first end cap having a neck portion with a first sealing member positioned thereabout, and having an axial passage extending therethrough, the first end cap configured to cover the first end surface and to provide communication between the axial passage of the first end cap and the axial cavity of the carbon block filter element; and c) a second end cap positioned at the second end surface of the carbon block filter element, the second end cap having an imperforate base wall and engagement structure formed thereon for engaging complementary structure formed on the interior surface of the sump, the second end cap having a recessed area defined by an annular wall extending from the imperforate base wall and configured to cover the second end surface and the axial cavity of the carbon block filter element at the second end surface, wherein the annular wall of the second end cap is axially spaced from the engagement structure of the second end cap in a direction toward said first end cap, a sealing member is axially disposed between the annular wall and the engagement structure, and the second end cap forms a sealed closure for the reception port of the sump.

12. A replacement filter cartridge for a water filtering system as recited in claim 11, wherein the engagement structure includes diametrically opposed engagement structures.

13. A replacement filter cartridge for a water filtering system as recited in claim 11, further comprising a centering collar formed within the recessed area.

14. A replacement filter cartridge for a water filtering system as recited in claim 11, wherein the second end cap includes structure to facilitate axial rotation of the replacement filter cartridge.

* * * * *